J. GRIMES.
AUTOMATIC FEED GATE.
APPLICATION FILED NOV. 6, 1913.

1,126,756.

Patented Feb. 2, 1915.

Witnesses:
Sully Russo
Alan Franklin

Inventor
Josiah Grimes.

UNITED STATES PATENT OFFICE.

JOSIAH GRIMES, OF ALHAMBRA, CALIFORNIA, ASSIGNOR OF ONE-HALF TO BIRD F. LYTTLE, OF LOS ANGELES, CALIFORNIA.

AUTOMATIC FEED-GATE.

1,126,756. Specification of Letters Patent. Patented Feb. 2, 1915.

Application filed November 6, 1913. Serial No. 799,613.

*To all whom it may concern:*

Be it known that I, JOSIAH GRIMES, a citizen of the United States, residing at Alhambra, in the county of Los Angeles and State of California, have invented a new and useful Automatic Feed-Gate, of which the following is a specification.

This invention relates to a feed gate for controlling the feed or discharge from bins or hoppers and is particularly intended for use in connection with automatic scales, for cutting off the discharge of material from the bin when the proper amount has been weighed out.

The main object of the present invention is to provide an electromagnetically controlled feed gate of extreme sensitiveness and accuracy in operation.

A further object of the invention is to provide a feed gate in which there is substantially no friction on the detent means for holding the gate open.

Another object of the invention is to provide an automatic feed gate in which the wear of the controlling parts is reduced to a minimum, and any wear which does result, does not affect the certainty or accuracy of the operation.

Other objects of the invention will appear hereinafter.

Figure 1:
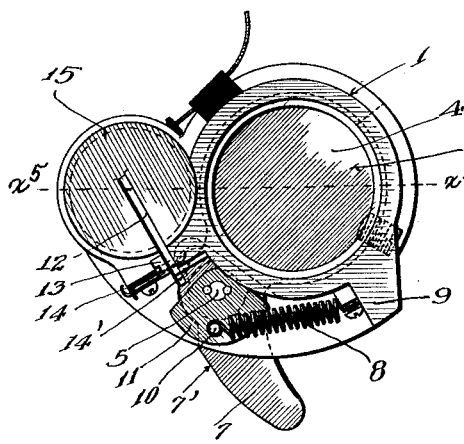
Figure 2:
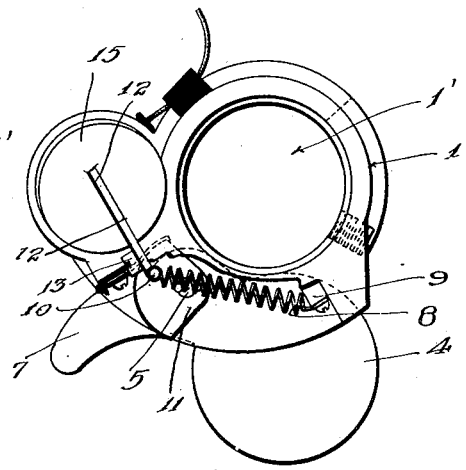
Figure 3:
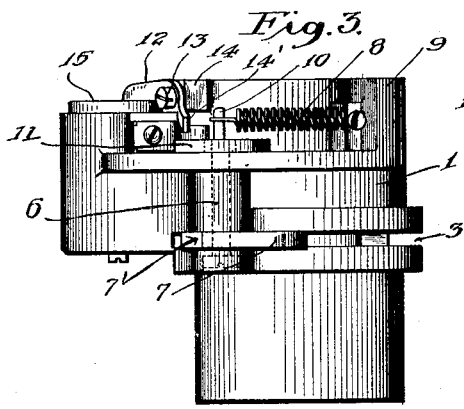
Figure 4:
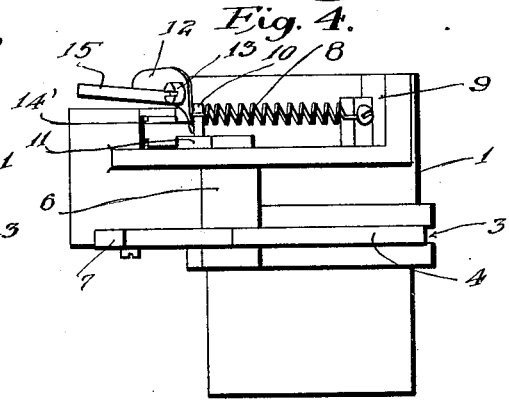
Figure 5:
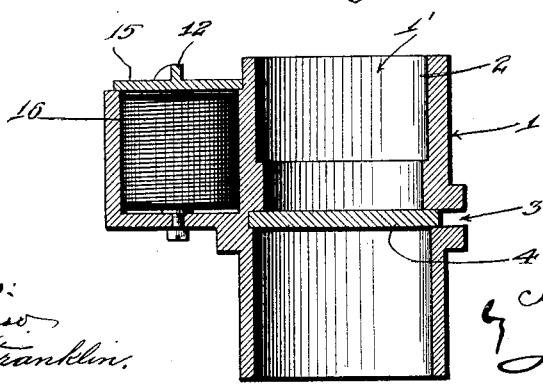

The accompanying drawings illustrate an embodiment of my invention, and referring thereto: Figure 1 is a plan of the feed gate in closed position. Fig. 2 is a plan thereof in open position. Fig. 3 is a side elevation of the feed gate in closed position. Fig. 4 is a side elevation of the same in open position. Fig. 5 is a vertical section on line $x^5$—$x^5$ in Fig. 1.

The feed gate is provided with a casing 1 having a tubular portion 2 adapted to fit on the mouth or discharge opening of a bin, and provided with a feed opening or passage 1'. The casing 1 is slotted at one side as shown at 3, to receive a flat horizontal gate 4 formed as a disk adapted to extend across and close the feed opening of the casing and pivotally mounted at 5 on a flange 6 on the casing. Said gate is provided with a tail or operating handle 7 extending outwardly beyond the flange 6 in convenient position for manipulation by the fingers of an operator. A spring 8 is connected at one end to a bracket 9 on the casing 1, and at the other end to a pin 10 carried by a segment 11 fixed on the pivot shaft 5 of the gate, the pin being so mounted relatively to the gate that when the gate is in open position shown in Fig. 2, the pin 10 is nearer the dead center line of action of the spring 8 relatively to the pivot shaft 5, but is slightly on the inner side of the dead center line, so that the tension of the spring 8 exerted along the axis of the spring tends to hold the gate in open position. Trip means are provided for pushing the pin 10 past the dead center so as to enable the spring 8 to close the gate, said trip means consisting of a trip lever 12 pivoted at 13 on a fixed support 14, one arm of said lever extending downwardly from the pivot and engaging with the side of pin 10 in the open position of the valve, and the other arm of said lever carrying an armature 15 for an electromagnet 16. The handle 7 for the gate is provided with a stop face 7' adapted to engage the side of the casing 1 when the gate is fully opened, so as to limit the opening movement and limit the movement of the armature lever due to engagement of the pin 10 therewith, the construction being such that the armature is separated from its magnet by positive action of said pin, instead of by gravity or weight.

The operation is as follows: The gate is normally in the position shown in Fig. 1, so as to close the feed opening of the casing 1, and when it is desired to discharge material from the bin, the handle 7 is pulled so as to move the gate 4 to open position shown in Fig. 2, this movement causing the pin 10 to pass the dead center position with reference to the pivot shaft 5 and the line of action of spring 8, the tension of the spring then holding the gate in open position. When it is required to shut the gate, electromagnet 16 is energized, causing its armature 15 to be attracted and pressing the lever arm 14' against pin 10 so that said pin is moved back over the dead center, whereupon the spring 8 draws the gate quickly to closed position.

What I claim is:

1. An automatic feed gate comprising a casing having a feed opening, a gate pivotally mounted on said casing, and adapted to close said opening, a handle connected to said gate, a member connected to said gate and provided with a projection, a spring connected to said casing and to said member, and movable past the pivot of the gate in the opening movement of the gate so as to tend to hold the gate in either closed or fully open position, a controlling magnet, an armature therefor, and a trip lever carrying said armature and provided with an arm adapted to engage one side of the aforesaid projection to move the gate past the dead center position when the armature is attracted, and to then allow the gate to be moved to closed position by the operation of said spring without further movement of said lever.

2. An automatic feed gate comprising a casing having a feed opening, a gate pivotally mounted on said casing and adapted to close said opening, a handle connected to said gate, a member connected to said gate and provided with a projection, a spring connected to said casing and to said projection on said member, and movable past the pivot of the gate in the opening movement of the gate so as to tend to hold the gate in either closed or fully open position, a trip lever pivotally mounted on the casing and having an arm adapted to engage one side of the aforesaid projection to move said projection by the operation of said lever so as to carry the spring past the dead center, to permit the gate to be closed by the operation of said spring without further movement of said trip lever.

In testimony whereof, I have hereunto set my hand at Los Angeles, California this 23rd day of October, 1913.

JOSIAH GRIMES.

Witnesses:
ARTHUR P. KNIGHT,
LORRAINE E. DURROW.

Copies of this patent may be obtained for five cents each, by addressing the "Commissioner of Patents, Washington, D. C."